United States Patent
Yoo et al.

(10) Patent No.: US 12,425,611 B2
(45) Date of Patent: Sep. 23, 2025

(54) SERVER AND CONTROL METHOD THEREOF

(71) Applicant: SAMSUNG ELECTRONICS CO., LTD., Suwon-si (KR)

(72) Inventors: Kiwon Yoo, Suwon-si (KR); Doohyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/226,344

(22) Filed: Jul. 26, 2023

(65) Prior Publication Data

US 2023/0370620 A1    Nov. 16, 2023

Related U.S. Application Data

(63) Continuation of application No. PCT/KR2022/003422, filed on Mar. 11, 2022.

(30) Foreign Application Priority Data

Apr. 19, 2021 (KR) .................. 10-2021-0050679

(51) Int. Cl.
H04N 19/00 (2014.01)
H04N 19/176 (2014.01)
H04N 19/70 (2014.01)

(52) U.S. Cl.
CPC ........... *H04N 19/176* (2014.11); *H04N 19/70* (2014.11)

(58) Field of Classification Search
CPC .............................. H04N 19/176; H04N 19/70
See application file for complete search history.

(56) References Cited

U.S. PATENT DOCUMENTS

| 9,131,033 | B2 | 9/2015 | Chen et al. |
| 9,237,342 | B2 | 1/2016 | Koyama et al. |
| 9,386,065 | B2 | 7/2016 | Lee et al. |
| 9,706,203 | B2 | 7/2017 | Eymery et al. |
| 9,743,114 | B2 | 8/2017 | Sullivan |

(Continued)

FOREIGN PATENT DOCUMENTS

| JP | 6164324 | 7/2017 |
| KR | 10-2011-0124161 | 11/2011 |

(Continued)

OTHER PUBLICATIONS

International Search Report dated Jun. 20, 2022 in International Patent Application No. PCT/KR2022/003422.
PCT/ISA/237 dated Jun. 20, 2022 in International Patent Application No. PCT/KR2022/003422.
Supplementary European Search Report dated Mar. 19, 2021 for corresponding application 22791884.4.

(Continued)

*Primary Examiner* — Zhihan Zhou
(74) *Attorney, Agent, or Firm* — STAAS & HALSEY LLP

(57) ABSTRACT

A server including a memory to store video content, a communication interface, and a processor configured to identify a frame of the video content as a plurality of groups which include a plurality of consecutive blocks based on at least one of low-latency encoding in association with the video content and latency setting information, encode the video content by encoding the plurality of consecutive blocks of the plurality of groups, and control the communication interface to transmit the encoded video content and the latency setting information in association with the video content to an electronic device.

10 Claims, 17 Drawing Sheets

(56) References Cited

U.S. PATENT DOCUMENTS

| | | | |
|---|---|---|---|
| 10,313,698 B2 | 6/2019 | Sullivan et al. | |
| 10,873,754 B2 | 12/2020 | Bruns et al. | |
| 10,931,982 B2 | 2/2021 | Soroushian | |
| 2007/0139229 A1* | 6/2007 | Berens | H03M 13/2789 |
| | | | 341/50 |
| 2011/0274180 A1 | 11/2011 | Lee et al. | |
| 2013/0058393 A1* | 3/2013 | Soroushian | H04N 19/146 |
| | | | 375/E7.026 |
| 2014/0187331 A1 | 7/2014 | Kim et al. | |
| 2014/0192893 A1* | 7/2014 | Sullivan | H04N 21/44016 |
| | | | 375/240.25 |
| 2014/0198839 A1 | 7/2014 | Potdar et al. | |
| 2018/0054616 A1* | 2/2018 | Meardi | H04N 19/88 |
| 2018/0084284 A1* | 3/2018 | Rosewarne | H04N 19/124 |
| 2019/0182495 A1* | 6/2019 | Bruns | G06F 9/3877 |
| 2020/0404337 A1 | 12/2020 | Sullivan | |
| 2022/0256194 A1 | 8/2022 | Kimura | |

FOREIGN PATENT DOCUMENTS

| | | |
|---|---|---|
| KR | 10-2013-0098336 | 9/2013 |
| KR | 10-1718603 | 3/2017 |
| KR | 10-2020-0075617 | 6/2020 |
| KR | 10-2140398 | 7/2020 |
| KR | 10-2163151 | 10/2020 |
| KR | 10-2179360 | 11/2020 |
| WO | WO 2020/255771 A1 | 12/2020 |

OTHER PUBLICATIONS

Korean Office Action issued Mar. 21, 2025 for Application No. 10-2021-0050679.

Communication pursuant to Article 94(3) EPC issued Apr. 29, 2025 for Application No. 22 791 884.4 English.

\* cited by examiner

SERVER AND CONTROL METHOD THEREOF

CROSS-REFERENCE TO RELATED APPLICATION(S)

This application is a continuation application, under 35 U.S.C. § 111(a), of international application No. PCT/KR2022/003422, filed on Mar. 11, 2022, which claims priority under 35 U. S. C. § 119 to Korean Patent Application No. 10-2021-0050679, filed on Apr. 19, 2021, the disclosures of which are incorporated herein by reference in their entireties.

BACKGROUND

Field

Apparatuses and methods consistent with the disclosure relate to a server and a control method thereof, and more particularly, to a server encoding video content and a control method thereof.

Description of the Related Art

As a resolution of video is improved with the recent development of electronic technology, a video compression technology for efficiently transmitting or storing the video has been developed.

General video compression is a lossy compression method in which original data is lost, and a compression ratio used is about 100 to 1000:1. In addition, all video compression standards are based on a hybrid block-based transform method, and core technologies are hybrid intra/inter prediction and discrete cosine transform. For the video compression, a method of removing spatial redundancy having high correlation of pixel values in adjacent pixels in a video frame, a method of removing temporal redundancy having high correlation of pixel values in adjacent pixels between video frames, a method of removing spectral redundancy using the fact that sensitivity of image information is not the same according to human visual characteristics, etc., are used. Specifically, a prediction block for a current block is generated using spatiotemporal redundancy, and the spectral redundancy of a difference block between the current block and the prediction block may be removed by transform/quantization. In addition, in-loop filtering that improves compression efficiency and subjective picture quality through entropy coding and post-processing image filtering using statistical characteristics between signals to be compressed may be performed. Such compression may be performed in units of blocks such as 16×16, 64×64, and 128×128 within a frame. The video compression as described above is referred to as encoding, and decompression of encoded video is referred to as decoding, which means the inverse of the encoding operation.

These encoding and decoding operations are factors that are essential operations as a capacity of video increases, but also cause latency in video streaming. For example, during video streaming such as live broadcasting, cloud game, media gateway, and smart car, latency due to encoding and decoding as well as transmission latency occurs. In particular, as illustrated in FIG. 1A, when a source device and a display device are wirelessly connected, a transmission bandwidth decreases, so the video compression and decompression operations are essential, and problems of image quality deterioration and latency (input lag or latency) due to compression occur.

In addition, in order to increase the compression efficiency, several frames to several tens of frames are buffered and the order of encoding processing is changed so that previous and subsequent frames may be referred to in the encoding process. For example, FIG. 1B illustrates a case of hierarchical level 3, and in this case, as illustrated FIG. 1C, buffering and latency of 8 frames occur.

In order to further reduce the latency, as illustrated in FIG. 1D, a method of referring to only a previous frame of hierarchical level 0 may be used, and in this case, as illustrated in FIG. 1E, buffering and latency of 1 frame occur. However, in this case, there is a problem in that the compression performance is lowered because inter-frame reference performance is lowered.

Additionally, in order to reduce the latency, there is a method of dividing a frame into slices composed of consecutive blocks. Each slice is compressed independently and compressed at a constant bit rate (CBR). In this case, the latency level is reduced to a sub-frame level. For example, as illustrated in FIG. 1F, when a frame is divided into 7 slices, a latency time is reduced to $1/7$ of frame latency.

However, since slices are compressed independently, the compression performance is degraded. In addition, since the encoded video has no information about what it is encoding for low-latency purpose, the decoder reconstructs the encoded video in units of frames. That is, there is a problem in that latency of one frame or more occurs at a decoder stage.

Accordingly, there is a need to develop a method of improving compression performance while minimizing latency during a video streaming operation.

SUMMARY

According to an embodiment of the disclosure, a server may include a memory to store video content, a communication interface, and a processor configured to identify a frame of the video content as a plurality of groups which include a plurality of consecutive blocks based on at least one of low-latency encoding in association with the video content and latency setting information in association with the video content, encode the video content by encoding the blocks of the plurality of groups, and control the communication interface to transmit the encoded video content and the latency setting information in association with the video content to an electronic device.

The processor may be configured to encode the video content so that the plurality of groups are compressed at a constant bit rate (CBR).

The processor may be configured to encode blocks of the plurality of groups based on dependency between adjacent groups among the plurality of groups.

The processor may be configured to acquire supplemental enhancement information (SEI) information corresponding to the plurality of groups in sequence or in units of frames based on the latency setting information, insert the acquired SEI information into a video layer, and transmit the acquired SEI information to the electronic device.

The processor may be configured to acquire SEI information corresponding to the plurality of groups in sequence or in units of frames based on the latency setting information, perform the encoding using the acquired SEI information, and transmit the acquired SEI information to the electronic device using an additional information transmission method in a system layer.

The server may further include a user interface, in which the processor may acquire the latency setting information based on at least one of a user command for a degree of latency received through the user interface or a quality of the video content.

The degree of latency may include one of a bit amount of the plurality of groups, a number of blocks of the plurality of groups, and a latency time corresponding to the plurality of groups.

The bit amount of the plurality of groups may be determined based on a target bit rate, a frame rate, the number of blocks of the plurality of groups, and a total number of blocks of a frame.

The latency time corresponding to the plurality of groups may be determined based on a frame rate, the number of blocks of the plurality of groups, and the total number of blocks of a frame.

According to an embodiment of the disclosure, a control method of a server may include identifying a frame of video content as a plurality of groups which include a plurality of consecutive blocks based on at least one of low-latency encoding in association with the video content and latency setting information in association with the video content, encode the video content by encoding the plurality of consecutive blocks of the plurality of groups, and transmitting the encoded video content and the latency setting information in association with the video content to an electronic device.

In the encoding, the video content may be encoded so that the plurality of groups are compressed at a constant bit rate (CBR).

In the encoding, the plurality of consecutive blocks of the plurality of groups may be encoded based on a dependency between adjacent groups among the plurality of groups.

In the transmitting, supplemental enhancement information (SEI) information corresponding to the plurality of groups may be acquired in sequence or in units of frames based on the latency setting information, the acquired SEI information may be inserted into a video layer, and the acquired SEI information may be transmitted to the electronic device.

In the transmitting, SEI information corresponding to the plurality of groups may be acquired in sequence or in units of frames based on the latency setting information, the encoding may be performed using the acquired SEI information, and the acquired SEI information may be transmitted to the electronic device using an additional information transmission method in a system layer.

The control method may further include receiving a user command for a degree of latency, and acquiring the latency setting information based on at least one of the received user command or a quality of the video content.

The degree of latency may include one of a bit amount of the plurality of groups, the number of blocks of the plurality of groups, and a latency time corresponding to the plurality of groups.

In addition, the bit amount of the plurality of groups may be determined based on a target bit rate, a frame rate, the number of blocks of the plurality of groups, and the total number of blocks of a frame.

The latency time corresponding to the plurality of groups may be determined based on a frame rate, the number of blocks of the plurality of groups, and the total number of blocks of a frame.

According to an embodiment of the disclosure, there is provided a non-transitory computer-readable recording medium in which a program for executing an operating method of a server is stored, the operating method comprises acquiring latency setting information including low-latency encoding in association with the video content and a degree of latency in association with the video content, identifying a frame of the video content as a plurality of groups which include a plurality of consecutive blocks based on the degree of latency, encoding the plurality of consecutive blocks of the plurality of groups to encode the video content, and transmitting the encoded video content and the latency setting information in association with the video content to an electronic device.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have," "may have," "include," "may include," or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B."

Expressions "first," "second," "$1^{st}$" or "$2^{nd}$" or the like, used in the disclosure may indicate various components regardless of a sequence and/or importance of the components, will be used only in order to distinguish one component from the other components, and do not limit the corresponding components.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In the disclosure, the term user may refer to a person using an electronic device or a device (for example, an artificial intelligence electronic device) using the electronic device.

The disclosure provides a server for minimizing latency occurring during reconstructing video content after transmission of the video content, and a control method thereof.

According to various embodiments of the disclosure as described herein, since video content provides low-latency encoded information to an electronic device that performs decoding, it is possible for a server to minimize latency occurring during decoding.

Also, since the server divides frames into arbitrary groups rather than slices, and each group can be referred to, it is possible to improve compression efficiency.

Hereinafter, various embodiments of the disclosure will be described in detail with reference to the accompanying drawings.

Figure 1A:
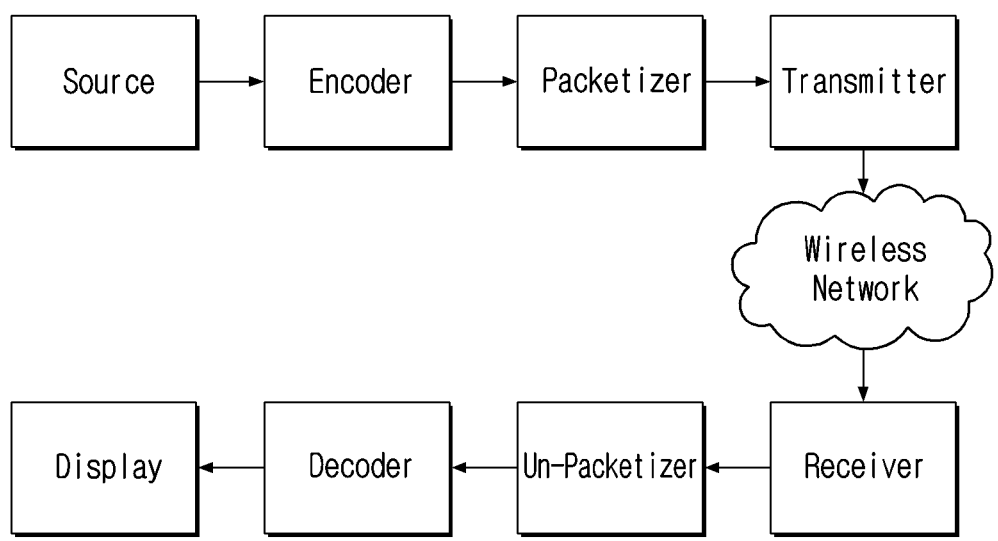
FIGS. 1A, 1B, 1C, 1D, 1E to 1F are diagrams for describing the related art.
Figure 1B:
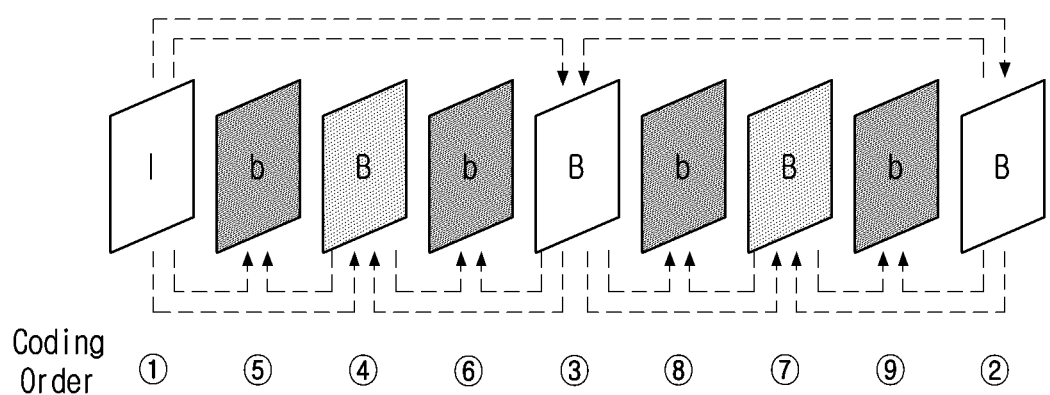
Figure 1C:
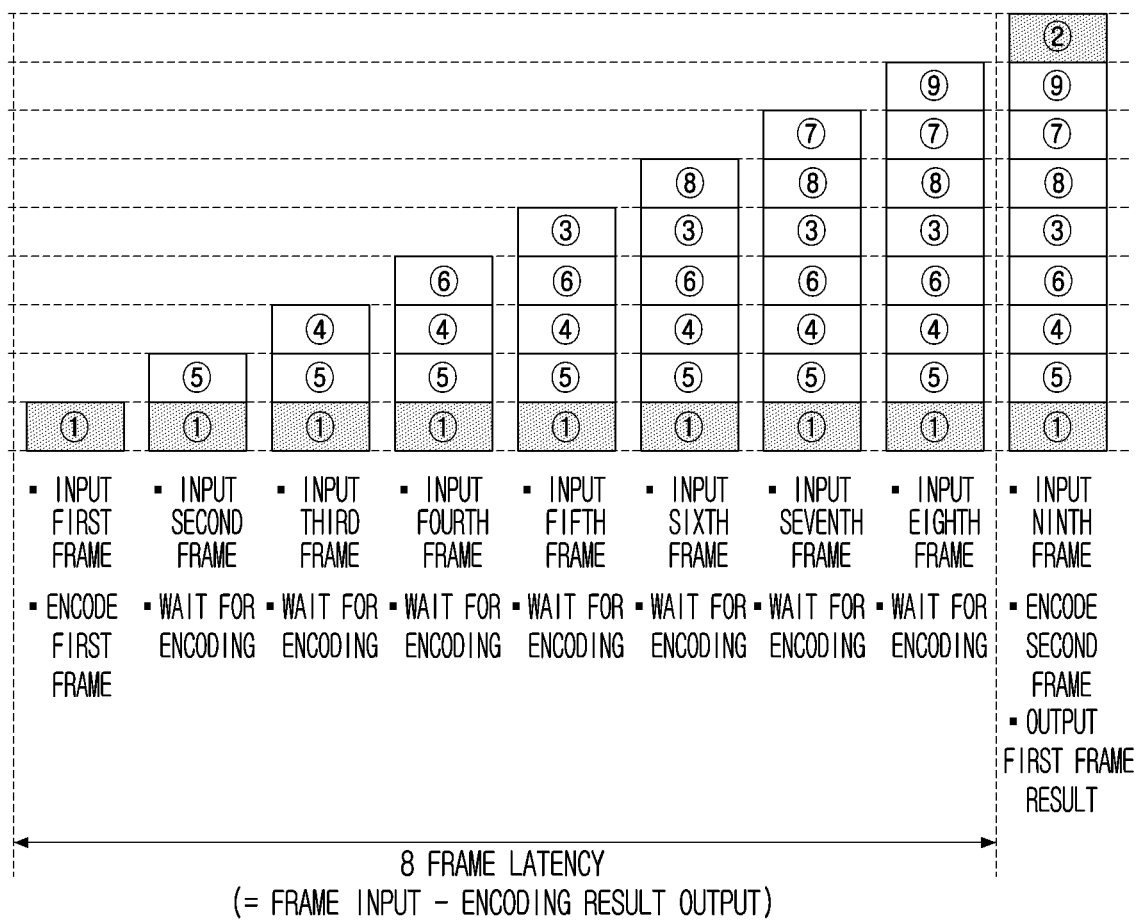
Figure 1D:
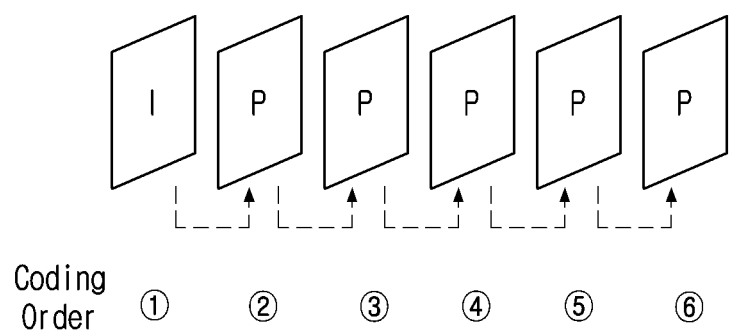
Figure 1E:
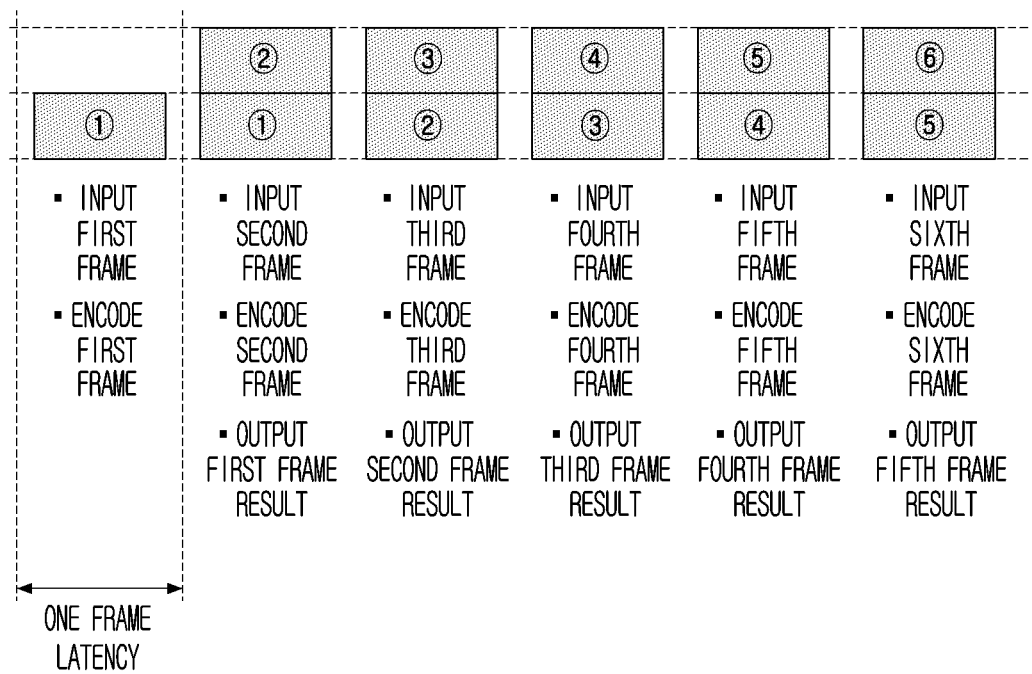
Figure 1F:
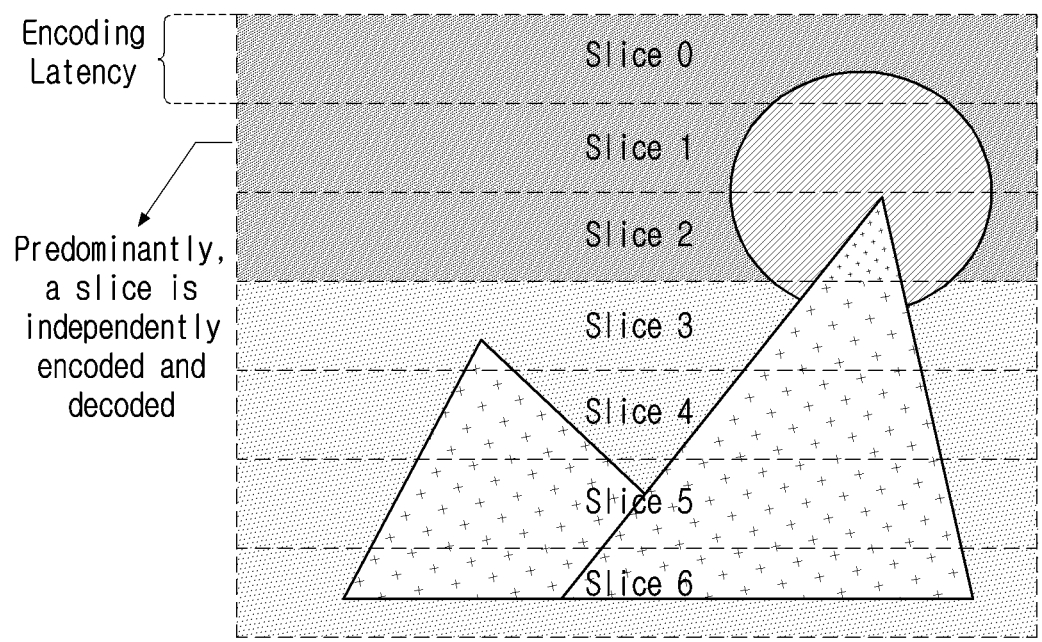
Figure 2:
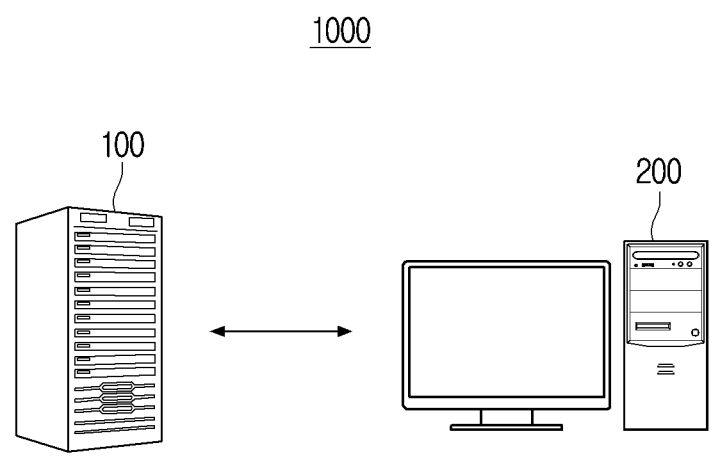
FIG. 2 is a diagram for describing an electronic system according to an embodiment of the disclosure.

FIG. 2 is a diagram for describing an electronic system 1000 according to an embodiment of the disclosure. As illustrated in FIG. 2, the electronic system 1000 may include a server 100 and an electronic device 200.

The server 100 is a device for encoding video content, and may be a desktop PC, a laptop computer, a smart phone, a tablet PC, and the like. However, the server 100 is not limited thereto, and the server 100 may be any device as long as it is capable of encoding video content.

The server 100 may perform communication with the electronic device 200. For example, the server 100 may transmit encoded video content to the electronic device 200. In particular, the server 100 may perform low-latency encoding on video content and transmit low-latency encoded video content and latency setting information to the electronic device 200. Here, the server 100 may identify frames of video content as a plurality of groups based on the latency setting information rather than slices, and perform low-latency encoding on blocks of a plurality of groups.

The electronic device 200 is a device that decodes encoded video content, and may be a set top box (STB), a desktop PC, a laptop computer, a smart phone, a tablet PC, a server, a TV, and the like. In particular, the electronic device 200 may have a display and display decoded video content. However, the electronic device is not limited thereto, and the electronic device 200 may be any device as long as it is capable of decoding the encoded video content.

The electronic device 200 may receive the low-latency encoded video content and the latency setting information from the server 100. The electronic device 200 may identify that the received video content is the low-latency encoded video content based on the latency setting information, and decode the low-latency encoded video content based on the latency setting information. In this case, the electronic device 200 does not perform decoding in units of frames, so the latency is reduced.

In the above, the operations of the server 100 and the electronic device 200 included in the electronic system 1000 have been briefly described. Hereinafter, the operation of the server 100 will be described in detail with respect to the low-latency encoding operation and transmission operation.

Figure 3:
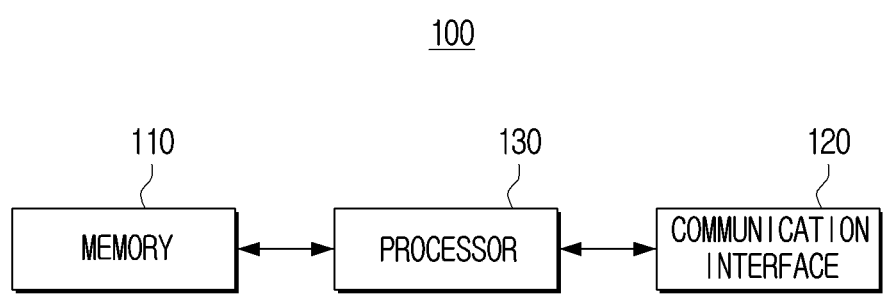
FIG. 3 is a block diagram illustrating a configuration of a server according to an embodiment of the disclosure.

FIG. 3 is a block diagram illustrating a configuration of the server 100 according to an embodiment of the disclosure.

Referring to FIG. 3, the server 100 includes a memory 110, a communication interface 120, and a processor 130.

The memory 110 may refer to hardware that stores information such as data in an electrical or magnetic form so that the processor 130 or the like may access the memory 110. To this end, the memory 110 may be implemented as at least one hardware of a non-volatile memory, a volatile memory, a flash memory, a hard disk drive (HDD), a solid state drive (SDD), a RAM, a ROM, or the like.

At least one instruction or module necessary for the operation of the server 100 or the processor 130 may be stored in the memory 110. Here, the instruction is a code unit instructing the operation of the server 100 or the processor 130, and may be written in machine language, which is a language that a computer may understand. A module may be an instruction set that performs a specific task in units of tasks.

The memory 110 may store data that is information in units of bits or bytes capable of representing characters, numbers, images, and the like. For example, the video content may be stored in the memory 110.

The memory 110 is accessed by the processor 130, and instructions, modules, or data may be read/written/modified/deleted/updated or the like by the processor 130.

The communication interface 120 is a component performing communication with various types of external apparatuses depending on various types of communication manners. For example, the server 100 may communicate with the electronic device 200 through the communication interface 120.

The communication interface 120 may include a wireless fidelity (WiFi) module, a Bluetooth module, an infrared communication module, a wireless communication module, and the like. Here, each communication module may be implemented in the form of at least one hardware chip.

The Wi-Fi module and the Bluetooth module perform communication in a Wi-Fi manner and a Bluetooth manner, respectively. In the case of using the Wi-Fi module or the Bluetooth module, various connection information such as a service set identifier (SSID), a session key, and the like, is first transmitted and received, communication is connected using the connection information, and various information may then be transmitted and received. The infrared communication module performs communication according to an infrared data association (IrDA) technology of wirelessly transmitting data to a short distance using an infrared ray positioned between a visible ray and a millimeter wave.

The wireless communication module may include at least one communication chip performing communication according to various wireless communication standards such as zigbee, $3^{rd}$ generation (3G), $3^{rd}$ generation partnership project (3GPP), long term evolution (LTE), LTE advanced (LTE-A), 4th generation (4G), 5th generation (5G), and the like, in addition to the communication manner described above.

Alternatively, the communication interface 120 may include a wired communication interface such as HDMI, DP, Thunderbolt, USB, RGB, D-SUB, and DVI.

In addition, the communication interface 120 may include a local area network (LAN) module, an Ethernet module, and at least one of wired communication modules performing communication using a pair cable, a coaxial cable, an optical fiber cable, or the like.

The processor 130 generally controls an operation of the server 100. Specifically, the processor 130 may be connected to each component of the server 100 to generally control the operation of the server 100. For example, the processor 130 may be connected to components such as the memory 110 and the communication interface 120 to control the operation of the server 100.

According to an embodiment, the processor 130 may be implemented by a digital signal processor (DSP), a microprocessor, or a time controller (TCON). However, the processor 140 is not limited thereto, but may include one or more of a central processing unit (CPU), a micro controller unit (MCU), a micro processing unit (MPU), a controller, an application processor (AP), a communication processor (CP), and an ARM processor, or may be defined by these terms. In addition, the processor 130 may be implemented by a system-on-chip (SoC) or a large scale integration (LSI) in which a processing algorithm is embedded, or may be implemented in a field programmable gate array (FPGA) form.

The processor 130 may acquire the low-latency encoding or not and the latency setting information. For example, the electronic device 100 may further include a user interface, and the processor 130 may acquire the latency setting information based on a user command for a degree of latency received through the user interface. For example, a user may input a low-latency encoding command and a command for dividing a frame into how many subframes, and the processor 130 may acquire the latency setting information based on the input command.

However, the processor 130 is not limited thereto, and the processor 130 may acquire the latency setting information based on at least one of the degree of latency and the quality of video content. For example, the processor 130 may acquire the latency setting information based on at least one of whether the degree of latency is within a predetermined time or whether the quality of encoded and decoded video content is within a threshold quality. In this case, the processor 130 may consider the computing power of the processor 130, the computing power of the electronic device 200, the communication state between the server 100 and the electronic device 200, the quality of video content, and the like.

Alternatively, the processor 130 may acquire the latency setting information based on a video content transmission history between the server 100 and the electronic device 200. For example, the processor 130 may use the previous latency setting information as it is when the degree of latency is within a preset time based on the video content transmission history.

The processor 130 may identify frames of video content as a plurality of groups each including a plurality of contiguous blocks, based on the latency setting information. Here, the degree of latency included in the latency setting information may include one of a bit amount of a plurality of groups, the number of blocks of a plurality of groups, and a latency time corresponding to a plurality of groups. For example, when the degree of latency included in the latency setting information includes 5, which is the number of blocks of the plurality of groups, the processor 130 may identify frames of video content as 5 groups.

Meanwhile, the bit amount of the plurality of groups may be determined based on a target bit rate, a frame rate, the number of blocks of the plurality of groups, and the total number of blocks of the frame, and the latency time corresponding to the plurality of groups may be determined based on the frame rate, the number of blocks of the plurality of groups, and the total number of blocks of the frame.

The processor 130 may encode the plurality of groups of blocks to encode the video content. Here, the processor 130 may encode the video content so that the plurality of groups are compressed at a constant bit rate (CBR). Accordingly, when the communication state is constant without an external factor, the transmission time of each group may be maintained the same.

Alternatively, the processor 130 may encode blocks of the plurality of groups based on dependency between adjacent groups among the plurality of groups. For example, when the frame of the video content is identified as two groups, the processor 130 may refer to the first group when encoding the second group after encoding the first group. That is, when dividing a frame into conventional slices through such an operation, a problem of deterioration in compression efficiency due to no reference between adjacent slices may be solved.

The processor 130 may control the communication interface 120 to transmit the encoded video content and the latency setting information to the electronic device 200.

For example, the processor 130 may acquire supplemental enhancement information (SEI) information corresponding to the plurality of groups in sequence or in units of frames based on the latency setting information, inserts the acquired SEI information into a video layer, and transmits the acquired SEI information to the electronic device 200.

Alternatively, the processor 130 may acquire the SEI information corresponding to the plurality of groups in sequence or in units of frames based on the latency setting information, perform the encoding using the acquired SEI information, and transmit the acquired SEI information to the electronic device 200 using an additional information transmission method in a system layer.

As described above, the server 100 may provide the low-latency encoded video content information to the electronic device 200, and the electronic device 200 may minimize the latency occurring in the decoding process by performing decoding video content based on low-latency encoded information in units of groups rather than in units of frames.

Hereinafter, the operation of the server 100 will be described in more detail with reference to FIGS. 4 to 8B. In FIGS. 4 to 8B, individual embodiments are described for convenience of description. However, individual embodiments of FIGS. 4 to 8B may be implemented in any combination.

Figure 4:
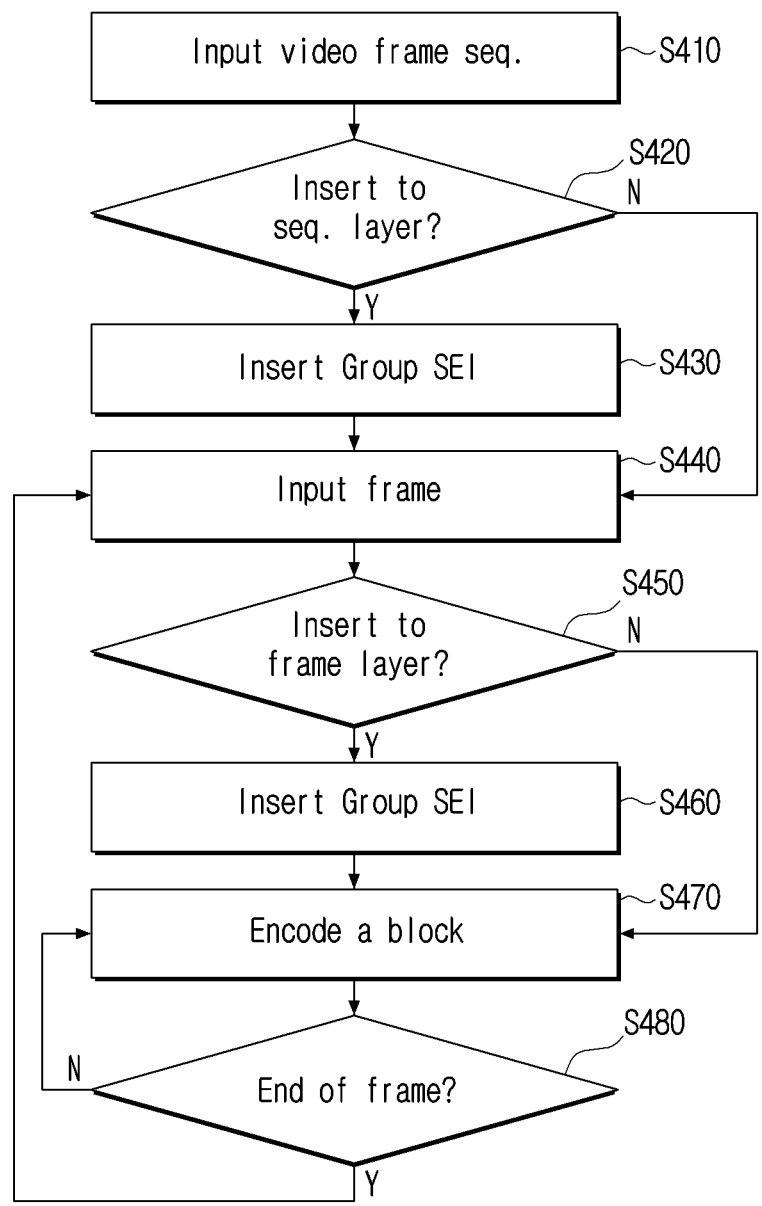
FIG. 4 is a flowchart for describing frame encoding in units of groups according to an embodiment of the disclosure.

FIG. 4 is a flowchart for describing frame encoding in units of groups according to an embodiment of the disclosure.

A plurality of groups of the disclosure can be used within the existing video standard, and is similar to a slice in that each group is composed of one or more consecutive blocks and compressed at a constant bit rate, but the dependency between neighboring groups is allowed during the encoding, and there is an unnecessary difference in header information.

In the frame encoding in units of groups, first, a video frame sequence is received (S410), and information on a group may be received from a user or a system in an encoding start stage of the video sequence (S420). Here, the information on the group may mean the latency setting information.

When the information on the group is received at the encoding start stage of the video sequence, the group SEI is inserted (S430) and the frame is received (S440), and when the information on the group is not received, the frame is received without inserting the group SEI (S440).

Also, the information on the group may be received from the user or system in the frame encoding start stage (S450). When the information on the group is received at the encoding start stage of the frame, the group SEI is inserted (S460) and the block encoding is performed (S470), and when the information on the group is not received, the block encoding may be performed without inserting the group SEI (S470).

This operation is performed for one frame (S470), and when a new frame is input, it is possible to identify whether the information on the group has been received from the user or system.

Here, the group SEI may be acquired based on the latency setting information, and may include at least one of the low-latency encoding or not or the information on the degree of latency. The degree of latency may include one of a bit amount of a plurality of groups, the number of blocks of a plurality of groups, and a latency time corresponding to a plurality of groups. Here, the bit amount of the plurality of groups may be determined based on a target bit rate, a frame rate, the number of blocks of the plurality of groups, and the total number of blocks of a frame. The latency time corresponding to the plurality of groups may be determined based on a frame rate, the number of blocks of the plurality of groups, and the total number of blocks of a frame.

Figure 5:
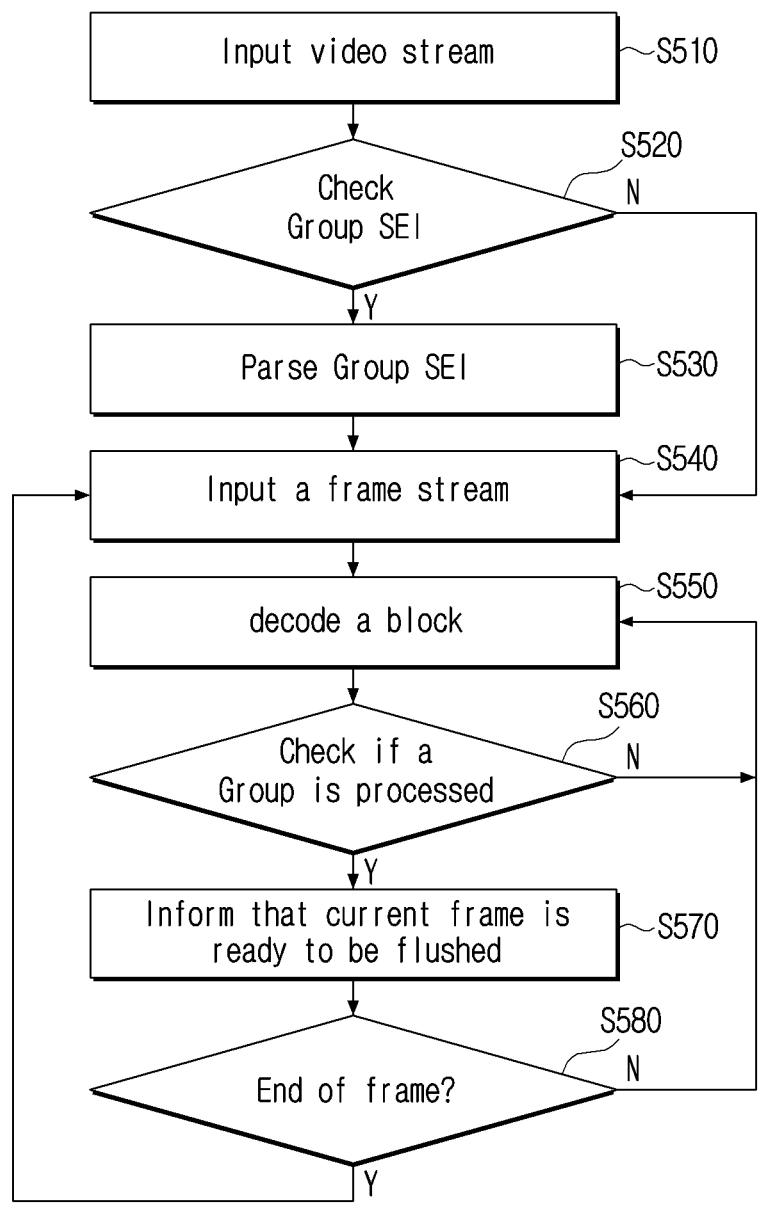
FIG. 5 is a flowchart for describing frame decoding in units of groups according to an embodiment of the disclosure.

FIG. 5 is a flowchart for describing frame decoding in units of groups according to an embodiment of the disclosure.

First, the electronic device 200 may receive a video stream (S510) and check a group SEI (S520). When the group SEI exists, the electronic device 200 may parse the group SEI (S530) and receive the frame stream (S540), and when the group SEI does not exist, the electronic device 200 may receive the frame stream without parsing the group SEI (S540).

The electronic device 200 may perform decoding in units of blocks (S550) and check whether processing of one group is completed (S560). This means that the decoding pipeline processing of the resulting video output from the stream input through the decoding can be simultaneously processed at an initial latency.

When the processing of one group is not completed, the electronic device 200 repeatedly performs the decoding in units of blocks, and when the processing of one group is completed, it may be identified that a reconstructed image for post-decoder processing is prepared even before the decoding of the current frame is completed (S570). The electronic device 200 may perform the above operations until the end of the frame (S580).

Figure 6A:
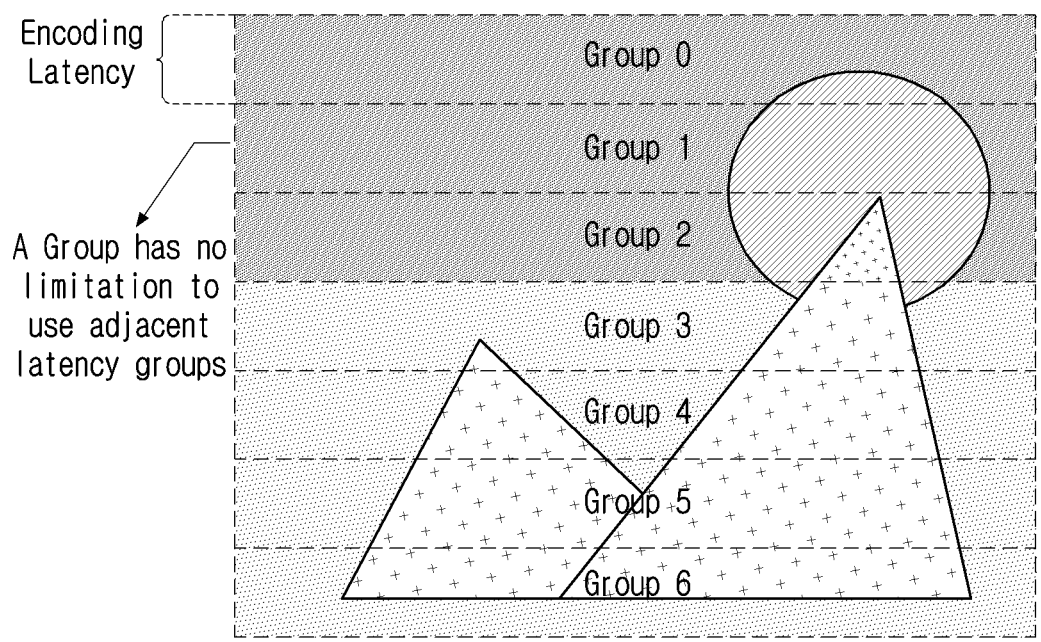
FIGS. 6A and 6B are diagrams for describing latency occurring during processing a frame in a group unit according to an embodiment of the disclosure.
Figure 6B:
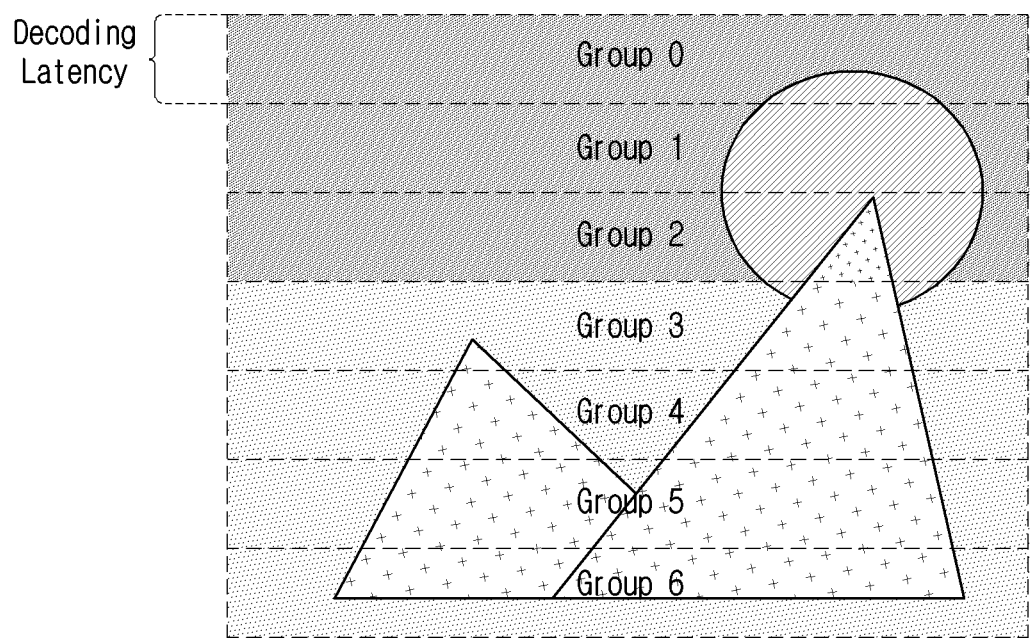

FIGS. 6A and 6B are diagrams for describing latency occurring during processing a frame in a group unit according to an embodiment of the disclosure. In FIGS. 6A and 6B, it is assumed that the frame is divided into 7 groups for convenience of description.

FIG. 6A illustrates latency in the encoding operation, and in the encoding operation, the latency time is the same as when the conventional frame is divided into 7 slices. However, in the case of using the conventional slices, each slice does not refer to another slice in the same frame, but each group of the disclosure may refer to another group in the same frame. Accordingly, the compression performance may be improved.

FIG. 6B illustrates latency in the decoding operation, and latency corresponding to the decoding time of the first group occurs. When the conventional frame is divided into 7 slices, latency occurs until one frame is completed. That is, in the related art, latency corresponding to the time required to decode all 7 slices occurs. Therefore, according to the disclosure, the latency is reduced to ⅐ of the related art.

Figure 7A:
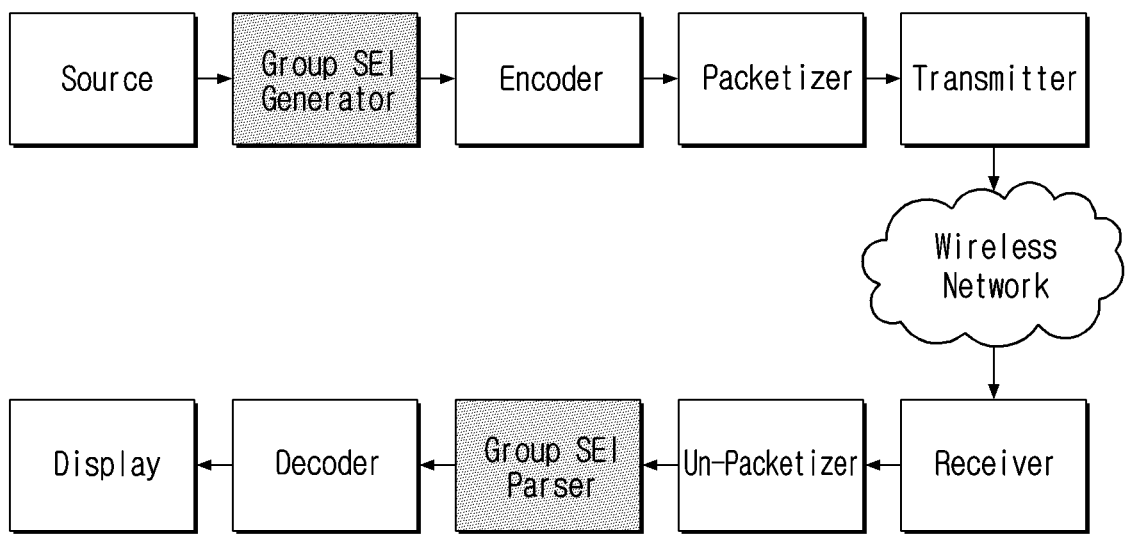
FIGS. 7A and 7B are diagrams for describing a method of processing SEI information according to various embodiments of the disclosure.
Figure 7B:
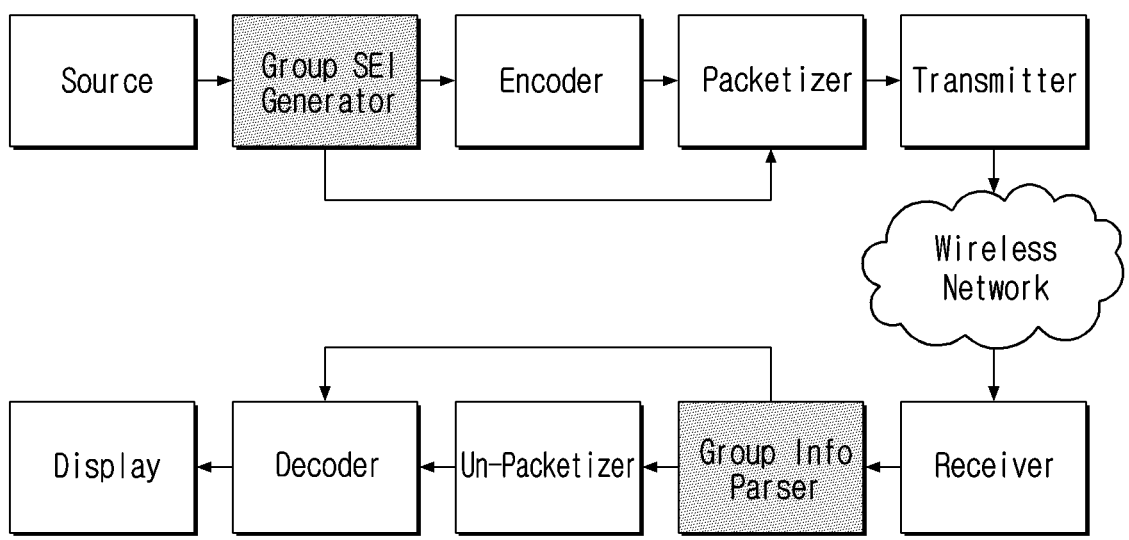

FIGS. 7A and 7B are diagrams for describing a method of processing SEI information according to various embodiments of the disclosure.

FIG. 7A illustrates an example of a system in which SEI information is applied to a video layer, and the server 100 may generate the SEI information in sequence or in units of frames at a front stage of an encoder, and insert the SEI information (or video usability information (VUI)) into the video layer.

The electronic device 200 may perform low-latency decoding by parsing the SEI information in the front stage of the decoder and passing the parsed SEI information to the decoder.

FIG. 7B illustrates an example of a system using group information in a system layer higher than a video layer, and the server 100 may generate the SEI information in sequence or in units of frames in a front stage of an encoder, and may use the generated SEI information during the encoding. In addition, the server 100 may transmit the SEI information to the electronic device 200 using an additional information transmission method within the system layer.

The electronic device 200 may parse the SEI information and then use the parsed SEI information for the decoding operation. Specifically, a pipeline operation is performed in units of groups in which an un-packetizer, a decoder, and a display are parsed, so end-to-end latency of the entire transmission system may be reduced. Here, the display may include all processes such as image quality improvement, scaler, and frame rate converter before an output image of the decoder is output to a screen in addition to the image output.

Figure 8A:
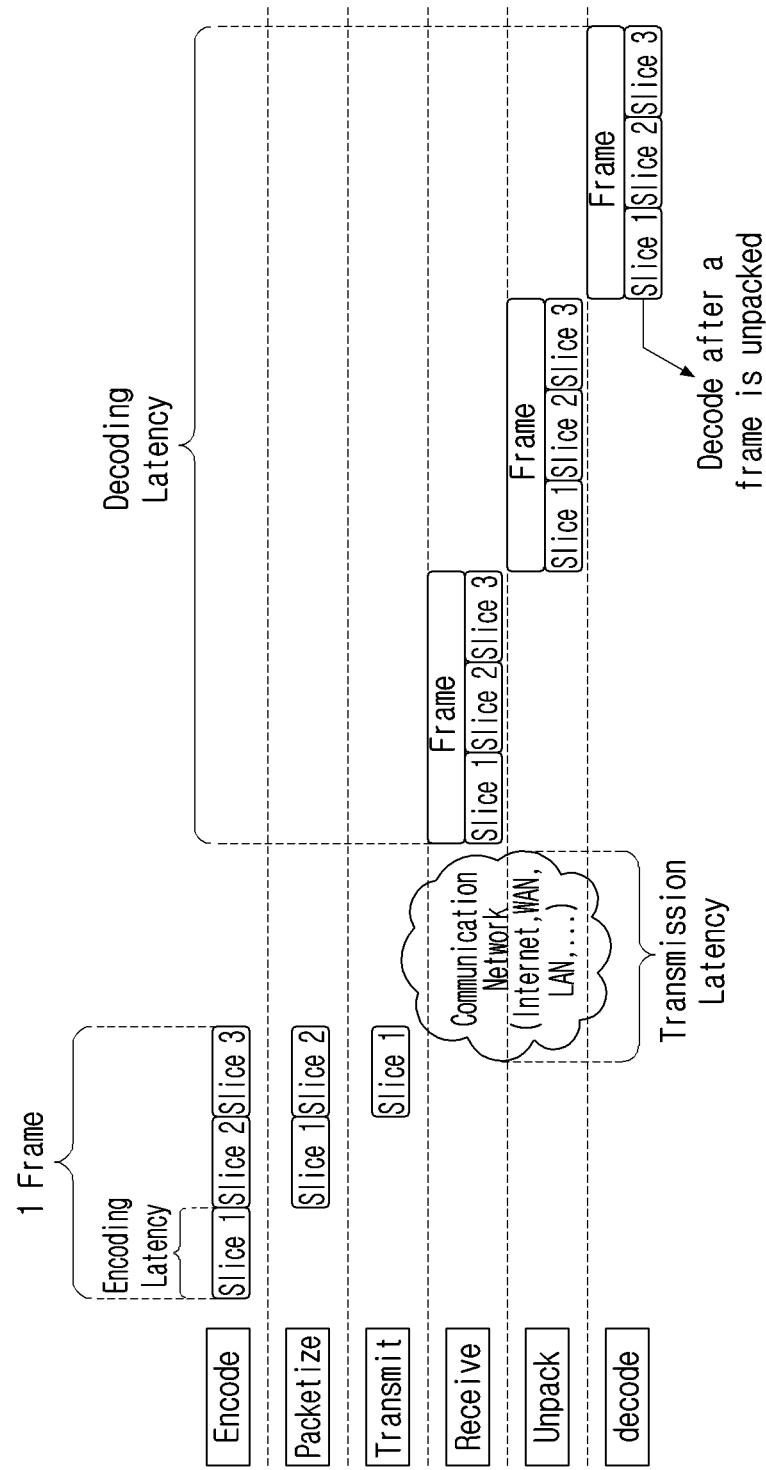
FIGS. 8A and 8B are diagrams for describing latency improvement of an electronic device according to an embodiment of the disclosure.
Figure 8B:
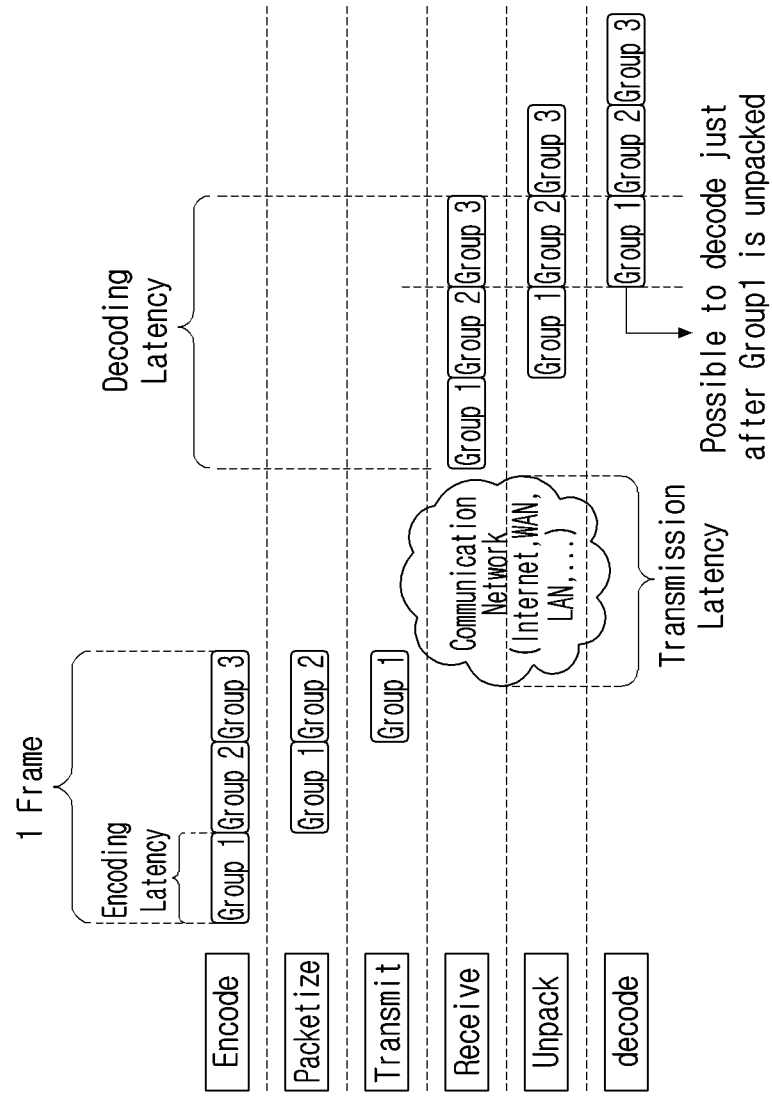

FIGS. 8A and 8B are diagrams for describing latency improvement of the electronic device 200 according to an embodiment of the disclosure.

FIG. 8A illustrates the conventional decoding process, and the latency of the decoding process becomes 1 frame as the decoding process is performed in units of frames due to the absence of the latency setting information. This means that a transmitter and a receiver of the entire transmission system may be synchronized based on the larger latency. That is, the latency of the entire system may be at least "2 frame latency+transmission latency."

FIG. 8B illustrates the decoding process of the disclosure, and the latency of the decoding process becomes 1 group due to the presence of the latency setting information. The latency of the entire system may be "2 group latency+transmission latency."

Figure 9:
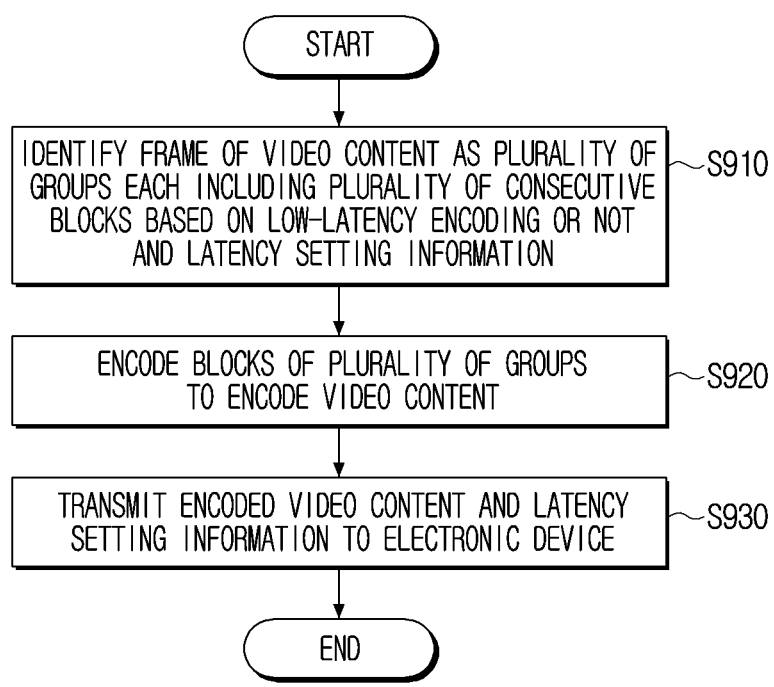
FIG. 9 is a flowchart for describing a method of controlling a server according to an embodiment of the disclosure.

FIG. 9 is a flowchart for describing a method of controlling a server according to an embodiment of the disclosure.

First, a frame of video content is identified as a plurality of groups each including a plurality of consecutive blocks based on low-latency encoding or not and latency setting information (S910). Then, the video content is encoded by encoding blocks of a plurality of groups (S920). Then, the encoded video content and latency setting information are transmitted to the electronic device (S930).

Here, in the encoding (S920), the video content may be encoded so that the plurality of groups are compressed at a constant bit rate (CBR).

In the encoding (S920), the blocks of the plurality of groups may be encoded based on dependency between adjacent groups among the plurality of groups.

In addition, in the transmitting (S930), the supplemental enhancement information (SEI) information corresponding to the plurality of groups may be acquired in sequence or in units of frames based on the latency setting information, and the acquired SEI information may be inserted into the video layer, and transmitted to the electronic device.

Meanwhile, in the transmitting (S930), the SEI information corresponding to the plurality of groups may be acquired in sequence or in units of frames based on the latency setting information, the encoding may be performed using the acquired SEI information, and the acquired SEI information may be transmitted to the electronic device 200 using the additional information transmission method in the system layer.

The method may further include receiving a user command for a degree of latency and acquiring the latency setting information based on at least one of the received user command and the quality of video content.

In addition, the degree of latency may include one of a bit amount of a plurality of groups, the number of blocks of a plurality of groups, and a latency time corresponding to a plurality of groups.

Here, the bit amount of the plurality of groups may be determined based on a target bit rate, a frame rate, the number of blocks of the plurality of groups, and the total number of blocks of a frame.

The latency time corresponding to the plurality of groups may be determined based on a frame rate, the number of blocks of the plurality of groups, and the total number of blocks of a frame.

According to various embodiments of the disclosure as described above, since video content provides low-latency encoded information to an electronic device that performs decoding, it is possible for a server to minimize latency occurring during decoding.

Also, since the server divides frames into arbitrary groups rather than slices, and each group can be referred to, it is possible to improve compression efficiency.

Meanwhile, according to an embodiment of the disclosure, various embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic device (for example, the electronic device A) according to the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, according to an embodiment of the disclosure, the above-described methods according to the diverse embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

In addition, according to an embodiment of the disclosure, the diverse embodiments described above may be implemented in a computer-readable recording medium or a device similar thereto using software, hardware, or a combination of software and hardware. In some cases, embodiments described in the disclosure may be implemented by the processor itself. According to a software implementation, embodiments such as procedures and functions described in the disclosure may be implemented by separate software modules. Each of the software modules may perform one or more functions and operations described in the disclosure.

Meanwhile, computer instructions for performing processing operations of the machines according to the diverse embodiment of the disclosure described above may be stored in a non-transitory computer-readable medium. The computer instructions stored in the non-transitory computer-readable medium allow a specific machine to perform the processing operations in the machine according to the diverse embodiments described above when they are executed by a processor of the specific machine. The non-transitory computer-readable medium is not a medium that stores data for a while, such as a register, a cache, a memory, or the like, but means a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

In addition, each of components (for example, modules or programs) according to various embodiments described above may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A server, comprising:
a memory to store video content;
a communication interface; and
a processor configured to:
obtain previous delay setting information as delay setting information in association with the video content based on a degree of latency is within a preset time based on video content transmission history between the server and an electronic device,
identify a frame of the video content stored in the memory as a plurality of groups based on at least one of low-latency encoding in association with the video content and the latency setting information, the plurality of groups being comprised of a plurality of consecutive blocks,
encode the video content by encoding the plurality of consecutive blocks of the plurality of groups making reference to a first group among the plurality of groups of the identified frame while encoding a second group among the plurality of groups subsequent to encoding the first group, and
control the communication interface to transmit the encoded video content and the latency setting information in association with the video content to the electronic device.

2. The server as claimed in claim 1, wherein the processor encodes the video content so that the plurality of groups are compressed at a constant bit rate (CBR).

3. The server as claimed in claim 1, wherein the processor encodes the plurality of consecutive blocks of the plurality of groups based on a dependency between adjacent groups among the plurality of groups.

4. The server as claimed in claim 1, wherein the processor is configured to acquire supplemental enhancement information (SEI) information corresponding to the plurality of groups in sequence or in units of frames based on the latency setting information, insert the acquired SEI information into a video layer, and transmit the acquired SEI information to the electronic device.

5. The server as claimed in claim 1, wherein the processor is configured to acquire SEI information corresponding to the plurality of groups in sequence or in units of frames based on the latency setting information, perform the encoding using the acquired SEI information, and transmit the acquired SEI information to the electronic device using an additional information transmission method in a system layer.

6. A control method of a server, comprising:
obtaining previous delay setting information as delay setting information in association with video content based on a degree of latency is within a preset time based on video content transmission history between the server and an electronic device;
identifying a frame of the video content as a plurality of groups based on at least one of low-latency encoding in association with the video content and the latency setting information, the plurality of groups being comprised of a plurality of consecutive blocks;
encoding the video content by encoding the plurality of consecutive blocks of the plurality of groups making reference to a first group among the plurality of groups of the identified frame while encoding a second group among the plurality of groups subsequent to encoding the first group; and
transmitting the encoded video content and the latency setting information in association with the video content to electronic device.

7. The control method as claimed in claim 6, wherein, in the encoding, the video content is encoded so that the plurality of groups are compressed at a constant bit rate (CBR).

8. The control method as claimed in claim 6, wherein, in the encoding, the plurality of consecutive blocks of the plurality of groups are encoded based on a dependency between adjacent groups among the plurality of groups.

9. The control method as claimed in claim 6, wherein, in the transmitting, supplemental enhancement information (SEI) information corresponding to the plurality of groups is acquired in sequence or in units of frames based on the latency setting information, the acquired SEI information is inserted into a video layer, and the acquired SEI information is transmitted to the electronic device.

10. The control method as claimed in claim 6, wherein, in the transmitting, SEI information corresponding to the plurality of groups is acquired in sequence or in units of frames based on the latency setting information, the encoding is performed using the acquired SEI information, and the acquired SEI information is transmitted to the electronic device using an additional information transmission method in a system layer.

* * * * *